(12) United States Patent
Robinson-Hard

(10) Patent No.: US 12,709,232 B2
(45) Date of Patent: Aug. 18, 2026

(54) VEHICLE RACK WIND DEFLECTOR AND NOISE REDUCTION APPARATUS

(71) Applicant: HOLMAN MANUFACTURING AND DISTRIBUTION, Mt. Laurel, NJ (US)

(72) Inventor: Kevin Robinson-Hard, Sacramento, CA (US)

(73) Assignee: HOLMAN MANUFACTURING AND DISTRIBUTION, Mt. Laurel, NJ (US)

( * ) Notice: Subject to any disclaimer, the term of this patent is extended or adjusted under 35 U.S.C. 154(b) by 66 days.

(21) Appl. No.: 18/511,028

(22) Filed: Nov. 16, 2023

(65) Prior Publication Data

US 2025/0162508 A1 May 22, 2025

(51) Int. Cl.
*B60R 9/05* (2006.01)
*B62D 35/00* (2006.01)

(52) U.S. Cl.
CPC .................................... *B60R 9/05* (2013.01)

(58) Field of Classification Search
CPC .................................. B60R 9/05; B62D 35/00
See application file for complete search history.

(56) References Cited

U.S. PATENT DOCUMENTS 6,425,507 B1 * 7/2002 Allen ........................ B60R 9/05 296/180.1
11,535,166 B1 * 12/2022 Huang .................... B60R 9/045
2003/0234268 A1 * 12/2003 Kubina ..................... B60R 9/05 224/309
2006/0163296 A1 * 7/2006 McMillan ................. B60R 9/05 224/319
2015/0069783 A1 * 3/2015 Webster .................... B60R 9/05 296/180.1
2016/0288724 A1 * 10/2016 Kmita ....................... B60R 9/05
2016/0362056 A1 * 12/2016 Ward ........................ B60R 9/05
2016/0362063 A1 * 12/2016 McFadden ............. B60R 9/058
2017/0210300 A1 * 7/2017 Roe ........................... B60R 9/05

FOREIGN PATENT DOCUMENTS

WO WO-0198109 A1 * 12/2001 ................ B60L 5/20

* cited by examiner

*Primary Examiner* — Derek J Battisti
(74) *Attorney, Agent, or Firm* — Gregory J. Winsky, Esq.; ARCHER & GREINER, P.C.

(57) ABSTRACT

A wind deflector for mitigating the aerodynamic shortcomings exhibited by racks and frames mounted to vehicles. The deflector includes a front, forward facing or wind facing section that is oriented toward the direction of travel of the vehicle. The deflector modifies air flow so that effects such as vortex shedding, which causes noise and the rack to undulate, are minimized. Airflow modifiers are formed or mounted on the front or wind facing section of the wind deflector. The modifiers are compact features such as indentations or projections that interdict and alter the airflow pattern around the wind deflector. The deflector may be attached to an existing rack or a rack may be constructed to include the wind deflector as an integral feature.

17 Claims, 8 Drawing Sheets

VEHICLE RACK WIND DEFLECTOR AND NOISE REDUCTION APPARATUS

FIELD

The present disclosure relates to wind deflector assemblies that minimize the adverse aerodynamic effects caused by vehicle mounted storage racks. In particular, the disclosure is directed to a wind deflector that is mounted onto a vehicle rack to reduce drag and wind noise.

BACKGROUND OF THE DISCLOSURE

Racks are mounted on motor vehicles for the transportation of loads, especially loads not conveniently carried within the allotted cargo space of the vehicle. The use of exteriorly mounted racks is common as is evidenced by most vehicles including features that are designed to act as attachment points for the mounting of a rack thereto. A rack can increase the load carrying capacity of a vehicle. In the context of non-commercial vehicles, it is typical to see luggage and recreational equipment such as skis and bicycles transported on such a rack. In commercial applications equipment such as ladders and tools are carried on an exteriorly mounted rack for transportation to a worksite allowing ready access from the exterior of the vehicle.

Racks are available in a variety of different configurations. Regardless of the variation in design, it is common for a rack to comprise a frame such as a basket, an open lattice or some specially designed feature purposed for the carrying a particular item or piece of equipment such as a bicycle or a ladder. The frame is mounted to the vehicle by a plurality of vertical bars connected to, and extending downwardly from, the rack. The vertical bars include footings that are configured to fit and attach to mounting points on the vehicle. One example is a rack employed on a flatbed truck. The footings extend downwardly and mount to the bed of the truck.

Although it is desirable to employ vehicle racks for their wide range of functionality, there are adverse effects associated with their use. Most vehicles are designed to maximize aerodynamic efficiency to minimize drag and increase fuel economy. Unfortunately, the addition of a rack adversely alters the aerodynamic profile of the vehicle. Air flowing past the leading edges of the rack increase drag. Additionally, the air flowing past the leading edge will have an oscillating flow pattern resulting in vortex shedding. This will cause the rack and the loads thereon to encounter buffeting. For example, a ladder mounted atop a rack will bounce up and down and could shake loose and fall off the vehicle. Obviously, such an event will lead to damage or accidents and is undesirable.

Additionally, the interaction of the leading edge of a rack with the air results in wind noise as the vehicle travels at speed. Wind noise can be extremely loud, for example, loud enough that two persons travelling in a vehicle must shout at each other to be heard. If the driver is listening to the entertainment system of the vehicle, he or she is forced to turn the volume to higher levels. If the operator is unable to use a handsfree device to communicate via cellphone, he or she may seek alternate means of communicating such as by texting while driving or speaking directly into the phone. Any or all of this results in distracted driving or driver fatigue. It is well known that distracted driving is a leading cause of automobile accidents.

The most common solution to mitigate the above shortcomings of a vehicle rack is to install a wind deflector on the leading edge of the rack. Wind deflectors can take on a variety of aerodynamic designs. Once such design includes an elliptical or sharpened trailing edge that reduces vortex shedding. The reduction of vortex shedding also reduces noise but not to the point where it is adequately mitigated as the primary design consideration is drag reduction. For this reason, additional attachments such as fairings have been employed. Usually, a fairing will attach to the rack on the trailing edge of the front cross bar. The addition of a fairing or other attachment increases the complexity of installation of the vehicle rack and can adversely affect the storage capacity of the rack.

What is needed is a wind deflector that is easy to install, reduces drag and significantly reduces noise without requiring additional components that are costly and burdensome to install.

SUMMARY OF THE DISCLOSURE

An apparatus for minimizing the adverse aerodynamic effects of a vehicle having a rack mounted thereto is disclosed. In particular, a wind deflector having features that modify and interdict airflow along its leading edge and wind facing surfaces is disclosed.

Vehicle racks typically have at least two elongated support bars that run along a substantial amount of the length of the vehicle. The elongated support bars are connected by cross bars that extend between the elongated supports. One example of a rack having these features is the Holman® Cargo Rack Pro III. As a vehicle is driven in a forward direction, air flows over the cross bars and generates drag and wind noise.

The wind deflector of the present disclosure is mounted onto the front of a vehicle rack to reduce these effects. The wind deflector includes a front, forward facing or wind facing section that is oriented toward the direction of travel of the vehicle. A bottom section extends rearwardly from the leading edge of the front surface. The front or wind facing section is sloped to lessen wind drag. The angle between the bottom and wind facing section may be varied to alter the slope of the forward-facing section. This will allow for optimization of the reduction of wind drag. The exact angle between the bottom section and the wind facing section will depend on the size and shape of the vehicle rack to which the wind deflector is attached.

The wind deflector of the current disclosure also moderates air flow so that effects such as vortex shedding, which causes noise and the rack to undulate, are minimized. Flow modifiers are formed or mounted on the front or wind facing section of the wind deflector. In one embodiment, air flow is moderated by a plurality of dimples or indentations located along the leading edge of the front or wind facing section. The indentations can take on a variety of profiles such as being v or u shaped, as viewed from the front of the wind deflector. In one embodiment, the indentations comprise a modified v-shape having a first section that slopes downward from the leading edge to a flat bottom section and a second section that slopes upwardly from the flat bottom surface to the leading edge. Additionally, non-symmetrical profiles can be used the combine differing sloped sections, for example, a more rounded or steeper first section and a more gradual second section.

The wind deflector is mounted to the front vertical cross bar of the vehicle rack. A top section is located at the upper end of the front, wind facing section. A rear section extends downwardly from said top section. The top section and rear sections are contoured to correspond to the shape of the top of the vertical bar of the vehicle rack. The contoured top section and rear section ensure that the wind deflector maintains a tight seating on the forward cross bar. The wind deflector's exact dimensions and shape may be varied to correspond to differing makes and models of commercially available racks.

The wind deflector can be attached to the forward cross bar of the rack using any known attachment assembly or may even be formed as an integral feature of the vehicle rack system. In one embodiment, the wind deflector includes slots and openings for the attachment of at least one retaining strap. The retaining strap attaches to the front or wind facing section and extends under the front bar of the vehicle rack and is attached to the rear section to retain the wind deflector on said front bar. The at least one retaining strap is an elongated curved member having a threaded flanged at the proximal end with a threaded aperture and a notched or hooking section at its distal end.

The wind facing or front section of the wind deflector has at least one aperture through it. The notched or hooking end of the strap is seated into a rear retaining slot in the wind deflector. This affixes the strap to the rear of the wind deflector. The retaining strap, now affixed at its distal end to the rear of the wind deflector, extends under the forward bar of the vehicle rack. The flanged distal end of the strap is then placed against the back of the front section of the wind deflector. A threaded fastener is then inserted through the aperture of the front or wind facing section and secured to the flanged section of the strap. Tightening the fastener secures the wind deflector to the forward bar of the vehicle rack.

Other applications and features of the present disclosure will become apparent to those skilled in the art when the following description is read in conjunction with the accompanying drawings.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

Figure 1:
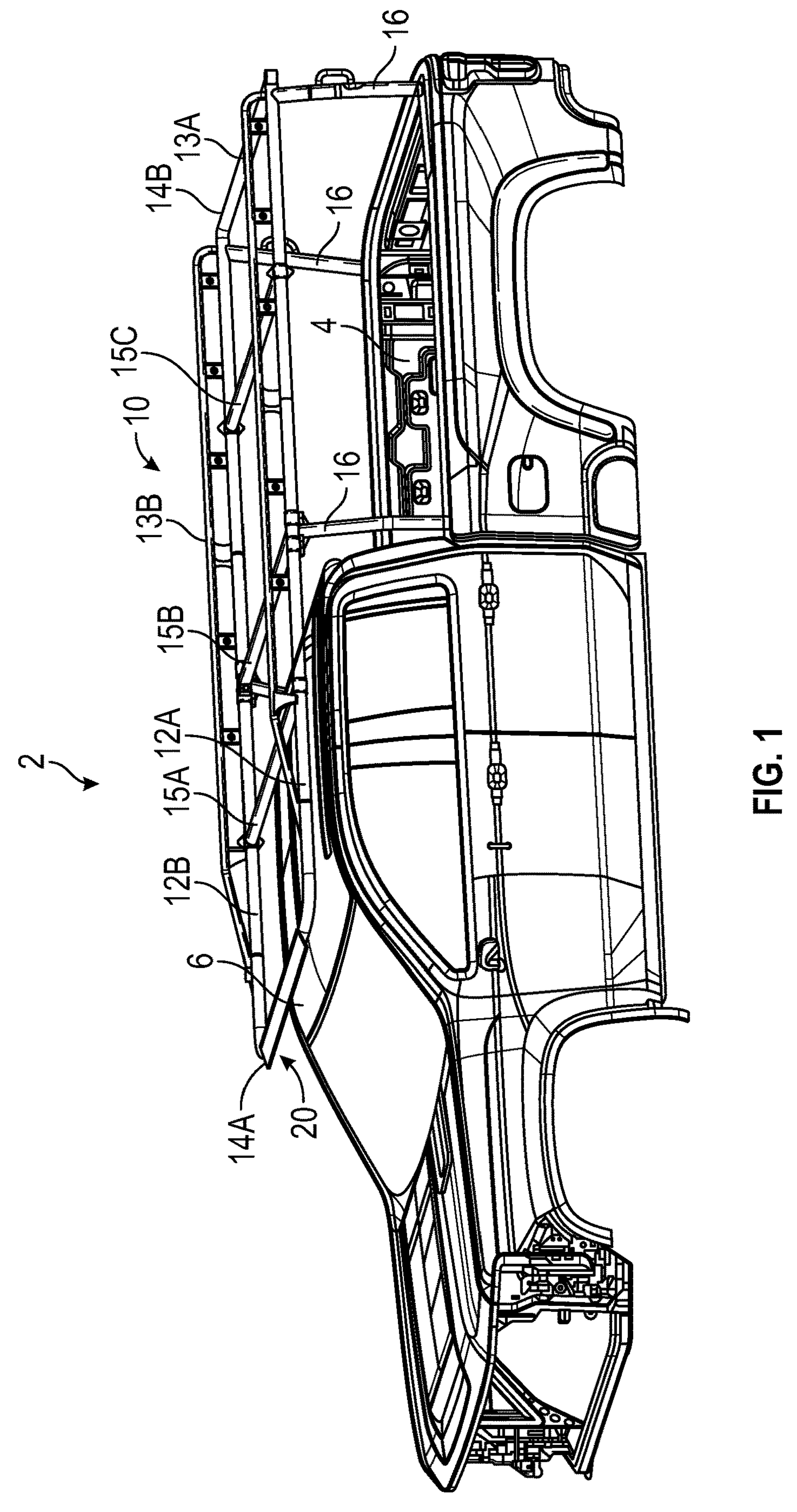
FIG. 1 is an overhead perspective view of an exemplary vehicle rack showing an embodiment of the wind deflector of the present disclosure attached thereto.

Exemplary embodiments are described herein to provide a detailed description of the present disclosure. Variations of these embodiments will be apparent to those of skill in the art. Moreover, certain terminology is used in the following description for convenience only and is not limiting. For example, the words "distal," "proximal," "right," "left," "top," "bottom," "upper," "lower," "inner" and "outer" designate directions in the drawings to which reference is made. The word "a" is defined to mean "at least one." The terminology includes the words above specifically mentioned, derivatives thereof, and words of similar import.

Figure 2:
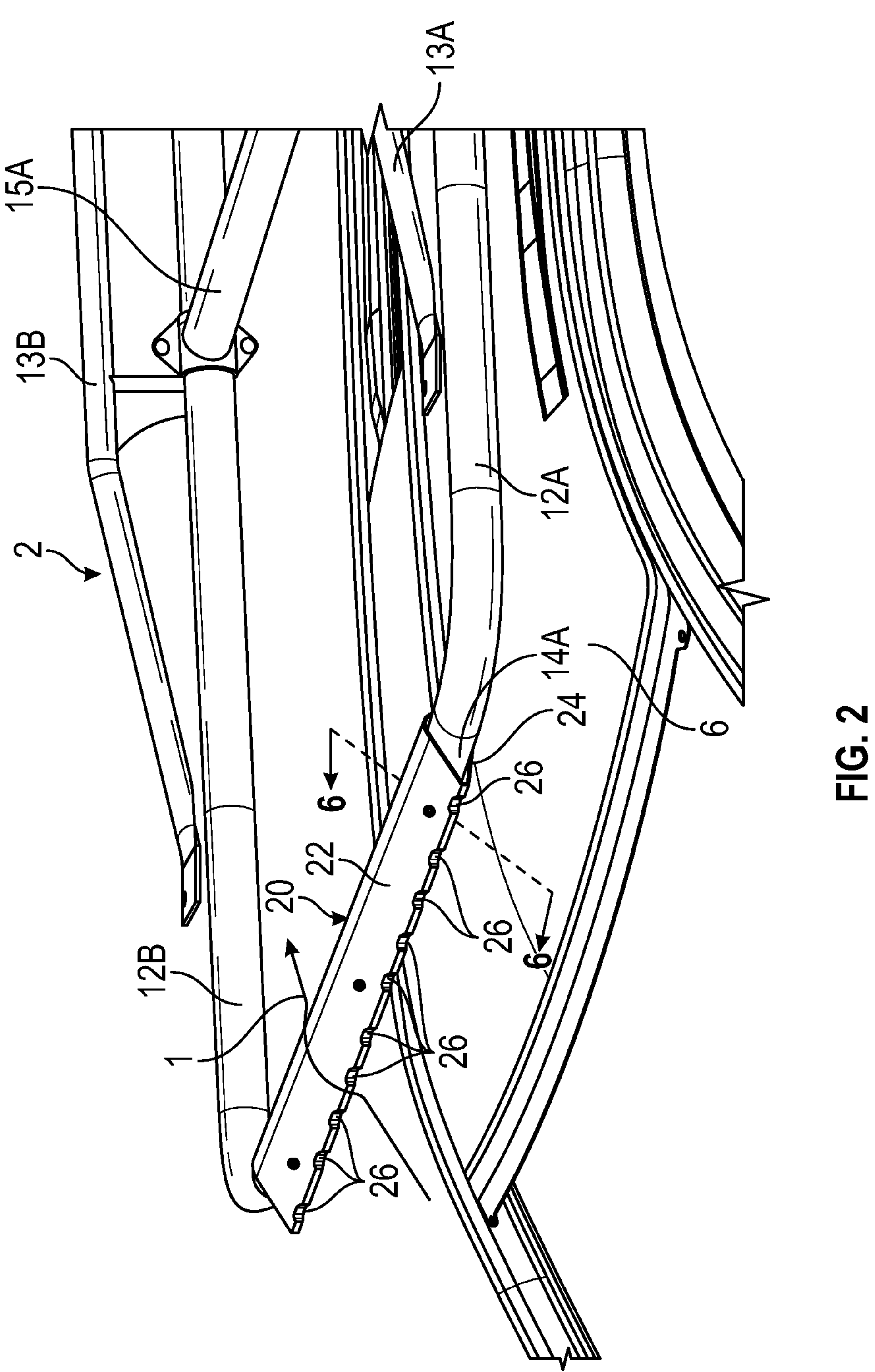
FIG. 2 is a detailed, cutaway view of the exemplary vehicle rack of FIG. 1 showing an embodiment of the wind deflector of the present disclosure attached thereto.

Referring to FIGS. 1 and 2 an embodiment of a wind deflector 20 is shown mounted to a vehicle rack 10. It being understood that the rack 10 is intended to be exemplary for purposes of the describing the wind deflector 20 and is no way intended to limit the applicability of the wind deflector 20 to other configurations of vehicle racks. The rack 10 may be mounted to various points on vehicles to carry cargo such as luggage, sports equipment, or tools such as ladders and cases and building materials such as lumber, pipes or the like. The side walls of the bed 4 of a truck 2 is shown in FIG. 1 as exemplary of a point for mounting rack 10. The wind deflector 20, however, can be utilized on racks 10 mounted on the roof, side, front or rear of the vehicle 2.

As shown in FIGS. 1 and 2 vehicle rack 10 has at least two elongated support bars 12A and 12B that run along a substantial amount of the length of the vehicle. The elongated support bars 12A and 12B are connected by vertical supports such as front and rear cross bars 14A and 14B that extend between the elongated supports 12A and 12B. One example of a rack having these features is the Holman® Cargo Rack Pro III. The elongated 12A, 12B and cross 14A, 14B bars are mounted on legs 16A-D which in turn sit on footings 18A-D. Each of the footings 18A-D fit within and attach to points on the bed 4 of a vehicle 2 thus affixing the vehicle rack 10 thereto. Still other features are included on the rack 10 to assist in retention of cargo placed thereon. For example, upper elongated bars 13A and B may be included that ensure cargo does not slip off the side of the rack 10. Additionally, upper bars 13A and B can be utilized to affix straps and other means for securing the cargo on the rack 10.

Figure 3:
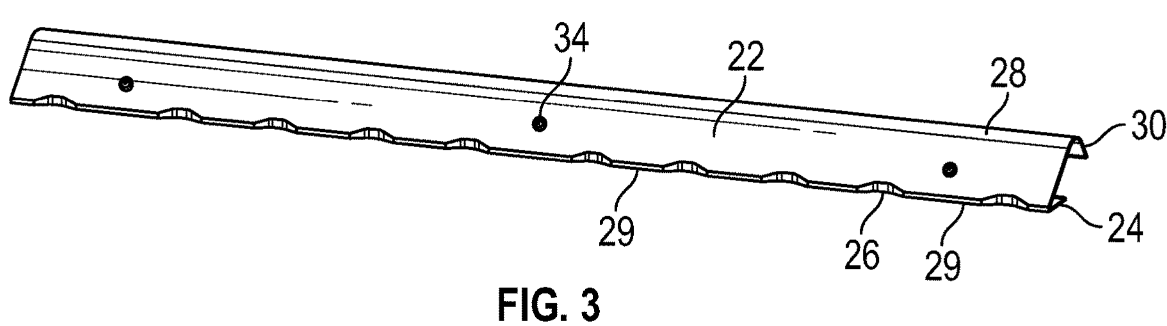
FIG. 3 is a front perspective view of an embodiment of the wind deflector of the present disclosure.
Figure 4:
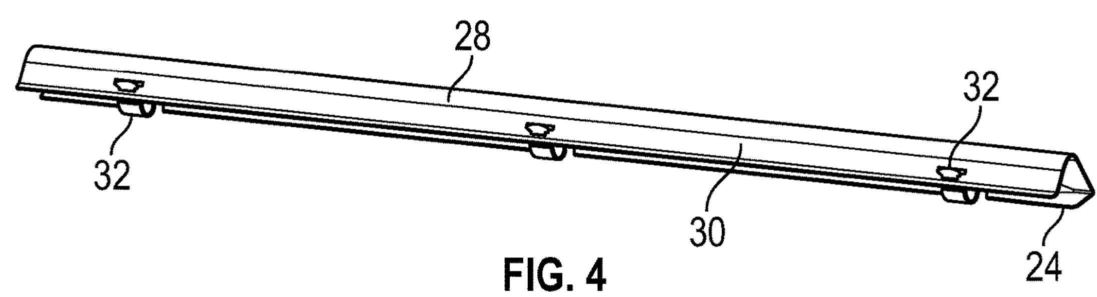
FIG. 4 is a rear perspective view of an embodiment of the wind deflector of the present disclosure.
Figure 5:
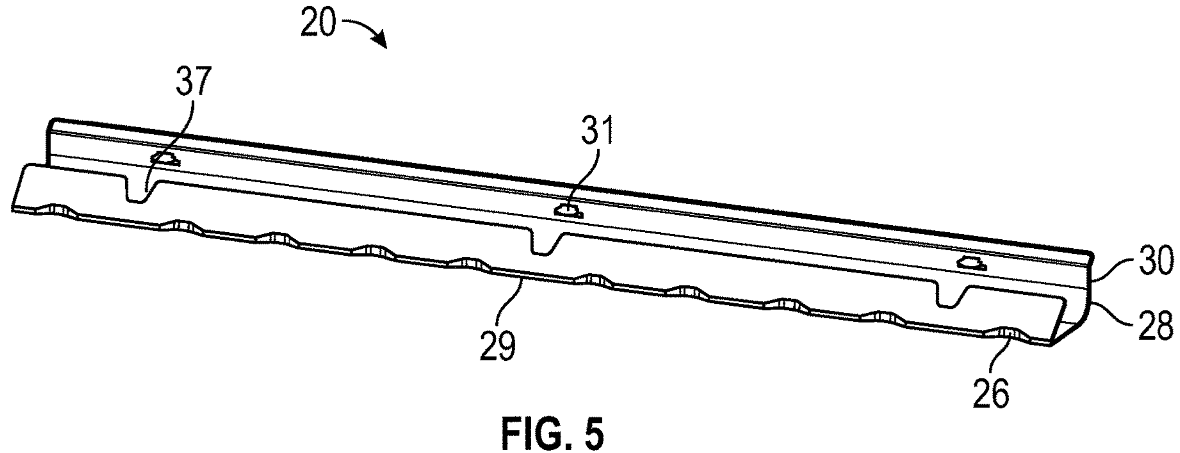
FIG. 5 is bottom perspective view of an embodiment of the wind deflector of the present disclosure.
Figure 6:
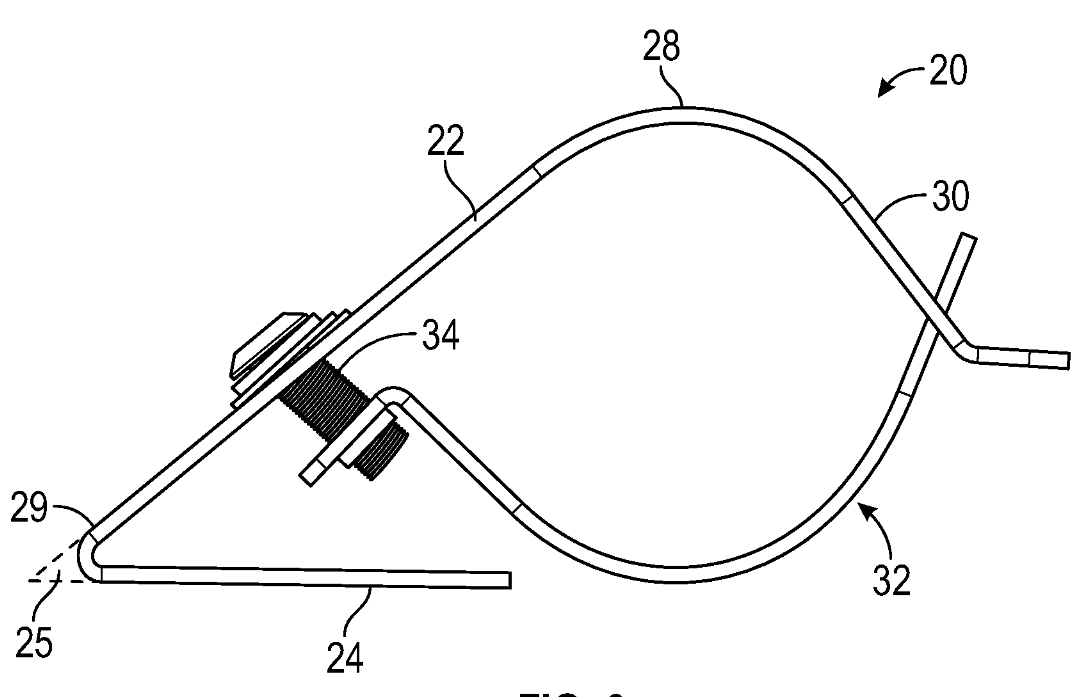
FIG. 6 is side cutaway view taken along Line 6-6 of FIG. 2 of an embodiment of an attachment assembly for fixing the wind deflector to the illustrated, exemplary vehicle rack.
Figure 7:
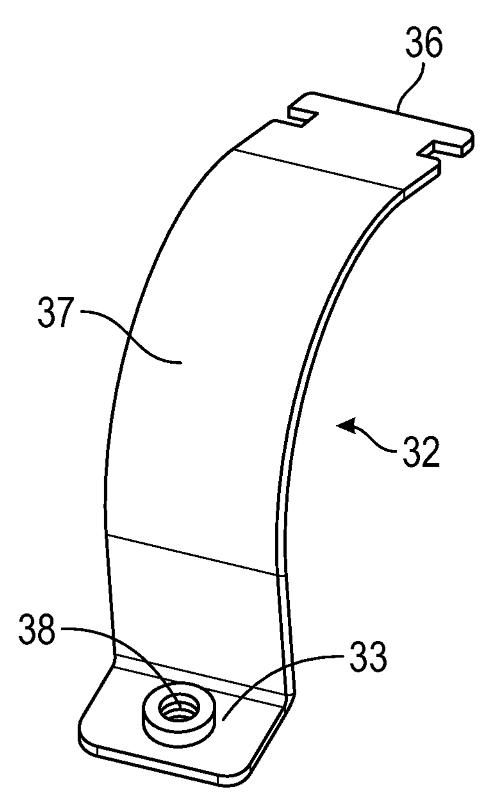
FIG. 7 is side perspective view of a retaining strap used to affix the wind deflector to a vehicle rack.

As shown in greater detail in FIGS. 3-5, the wind deflector 20 employed on the exemplary rack 10 includes a front, forward facing or wind facing section 22 that is oriented toward the direction of travel of the vehicle 2 to face the air flow 1. A bottom section 24 extends rearwardly from the leading edge 29 of the forward-facing section 22. The front or wind facing section 22 is sloped to lessen wind drag. The angle 25 between the bottom section 24 and the front section 22 may be varied to conform the wind deflector 20 to any rack on which it is placed to optimize drag reduction. Alternatively, rack 10 can be constructed such that deflector 20 is integral to the front support 14A thus ensuring proper customization of the deflector 20 the rack utilized. Wind deflector 20 can be constructed from a variety of materials such as steel, aluminum, composite material or even a plastic material. In addition, the wind deflector 20 may be constructed from a single piece of material or from components that are welded or otherwise assembled.

Wind deflectors are often designed with the sole consideration of reducing wind drag, but neglect other adverse factors. One such factor is wind noise that can be distracting to the driver and burdensome over long periods of time. The wind deflector 20 of the current disclosure does not suffer this limitation as it moderates air flow 1 and mitigates effects such as wind noise and rack 10 vibration. Flow modifiers 26 are formed or can be mounted on the front or wind facing section 22 of the wind deflector 20.

In one embodiment, air flow 1 is moderated by a plurality of integrally formed grooves or indentations 26 located along the leading edge 29 of the front or wind facing section 22. The indentations may be formed, for example, by using a press and brake during the manufacturing process for the wind screen 20. Alternately, the leading edge 29 may be continuous and formed to allow for grooved members to be added to and protrude slightly from the surface of leading edge 29 (not shown in the drawings). Such grooved members could be applied to the leading edge via adhesive or a locking system that allows for the grooved members to be snapped to the leading edge 29 as discussed in further detail below.

The use of specially shaped indentations 26 eliminates the need to install other means for modifying air flow 1 that may intrude upon and interfere with cargo stored proximally of front bar 14A of rack 10 or are difficult to attach onto the cross bar 14A. For example, in addition to a wind deflector, a rear facing fairing must be strapped to the front bar 14A and are difficult to install. Other racks use wires or cords that are wrapped around the front bar 14A.

The indentations 26 may take on a variety of shapes such as being semi-circular, "V" or "U" shaped. Each shape is chosen to optimize flow moderation and selection of a particular shape will depend on the configuration of the rack in question. As shown in greater detail in FIG. 8, the indentations 26 may comprise a modified v-shape having a first section 27A that slopes downwardly and away from the top of leading edge 29 to a flat bottom section 27C and a second section 27 B that slopes upwardly from the flat bottom section 27C to the top of leading-edge 29.

Wind deflector 20 is mounted to the front vertical cross bar 14A of the vehicle rack 10 such that a tight fit therebetween is maintained. A top section 28 is located at the upper end of the front, wind facing section 22. A rear section 30 extends downwardly from said top section 28. The top section 28 and rear section 30 are contoured to correspond to the shape of the top of the vertical bar 14A of the vehicle rack 10. The contour of top section 28 and rear section 30 ensure that the wind deflector 20 maintains a tight seating on the forward cross bar 14A.

The wind deflector 20 can be attached to the forward cross bar 14A of the rack using any known attachment assembly such as bands or screws. Alternatively, the rack 10 can be constructed such that a wind deflector is an integral, unitary feature of the vehicle rack system. In such a configuration, the forward cross bar 14A may be formed such that it includes a sloped wind facing section and a rounded rear section 30. The ends of this bar would attach to the elongated support bars 12A, 12B.

As shown in the embodiment of FIGS. 4-8 the wind deflector 20 includes at least one slot 31 and an aperture 39 for the attachment of at least one retaining strap 32. The retaining strap 32 attaches to the front or wind facing section 22 and extends under the front bar 14A of the vehicle rack 10 and is attached to the rear section 30 to retain the wind deflector 20 on the front bar 14A.

The retaining strap 32 has a central, elongated curved portion 37. The proximal end of curved portion 37 has a flange 33 with a threaded aperture 38. The distal end of curved portion 37 includes a hooking section 36. The wind facing or front section 22 of the wind deflector 20 has at least one aperture 39 through it. The notched or hooking end 36 of the strap 32 is seated into a rear retaining slot 31 in the wind deflector. This affixes the strap 32 to the rear of the wind deflector 20. The retaining strap 32, now affixed at its distal end to the rear of the wind deflector 20, extends under the forward bar 14A of the vehicle rack 10. The flanged distal end 33 of the strap 32 is then placed against the back of the front section of the wind deflector 20. A threaded fastener is then inserted through the aperture 39 of the front or wind facing section 22 and secured to the flanged section 33 of the strap 32. Tightening the fastener secures the wind deflector 20 to the forward bar 14A of the vehicle rack 10.

Figures 8, 9:
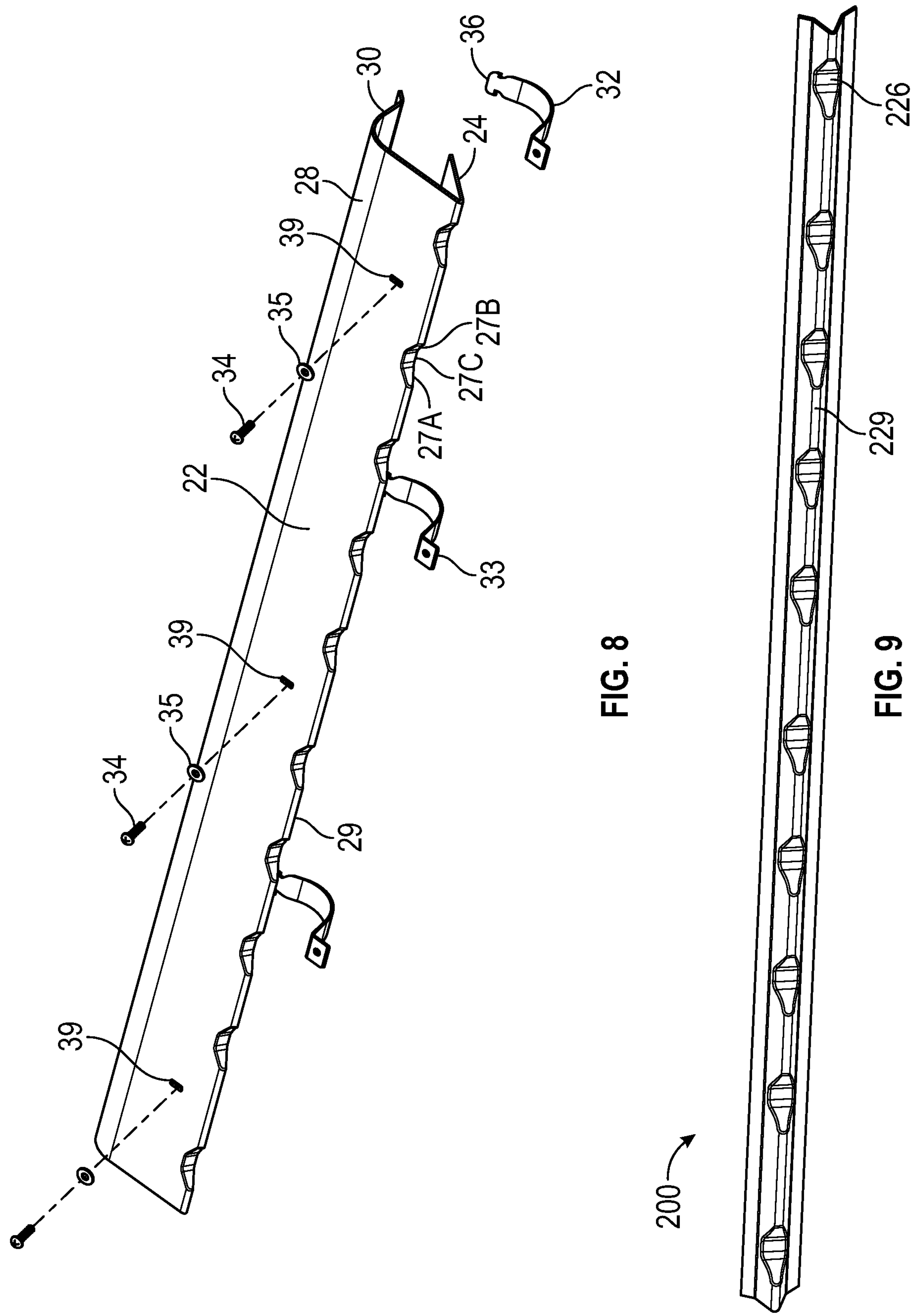
FIG. 8 is a front perspective view showing the assembly of the retaining strap of FIG. 7 to an embodiment of the wind deflector of the present disclosure.
FIG. 9 is a front view showing another embodiment of the wind deflector of the present disclosure.
Figure 9A:
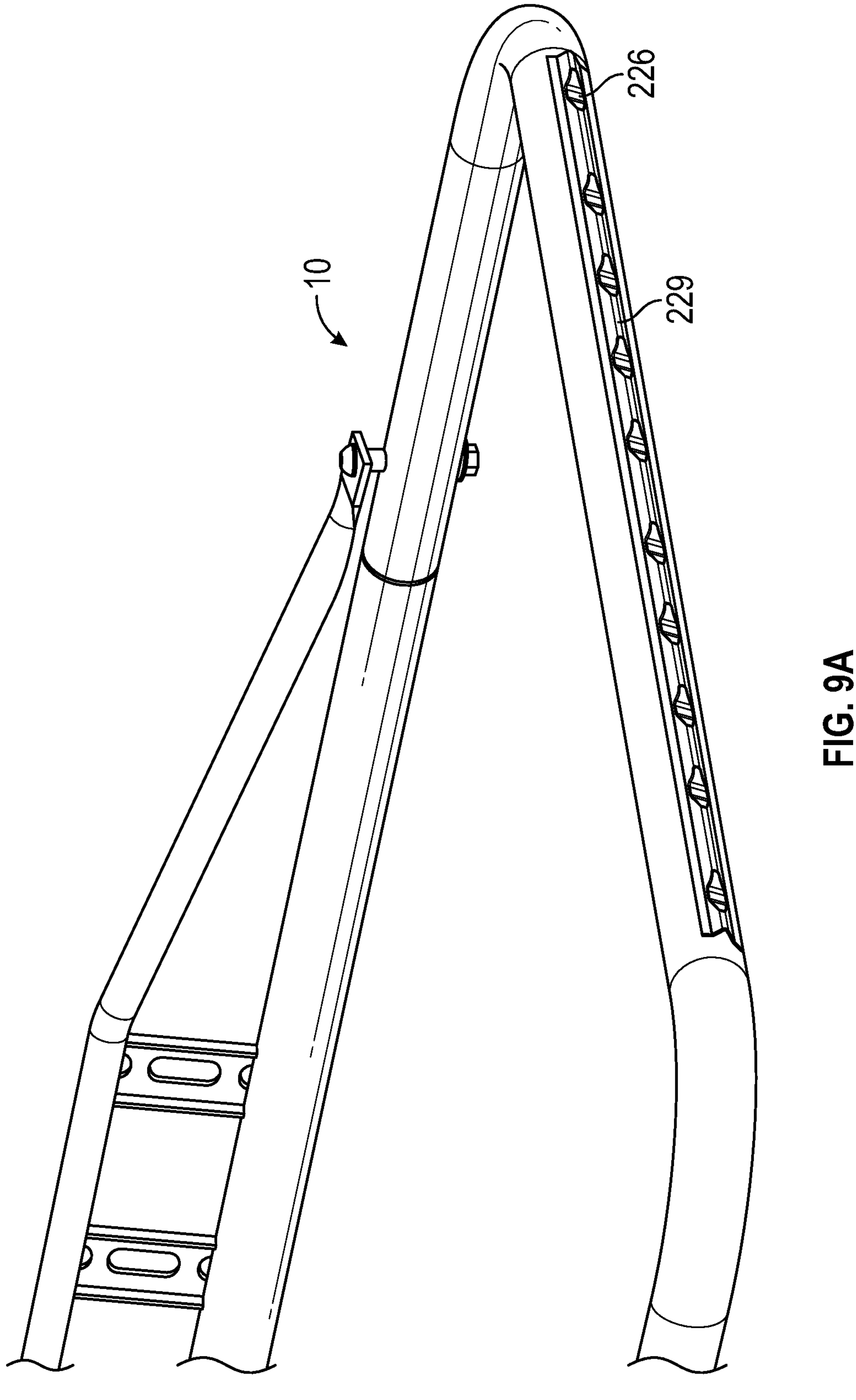
FIG. 9A is a front perspective view showing the wind deflector of FIG. 9 attached to a vehicle rack.
Figure 9B:
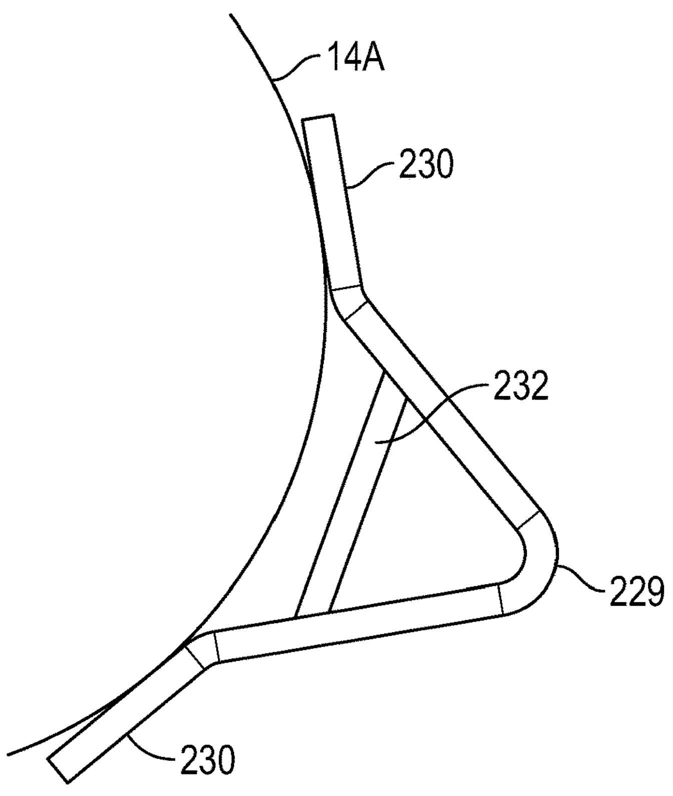
FIG. 9B is a side cutaway view of the wind deflector of FIG. 9 prior to affixation to a vehicle rack
Figure 9C:
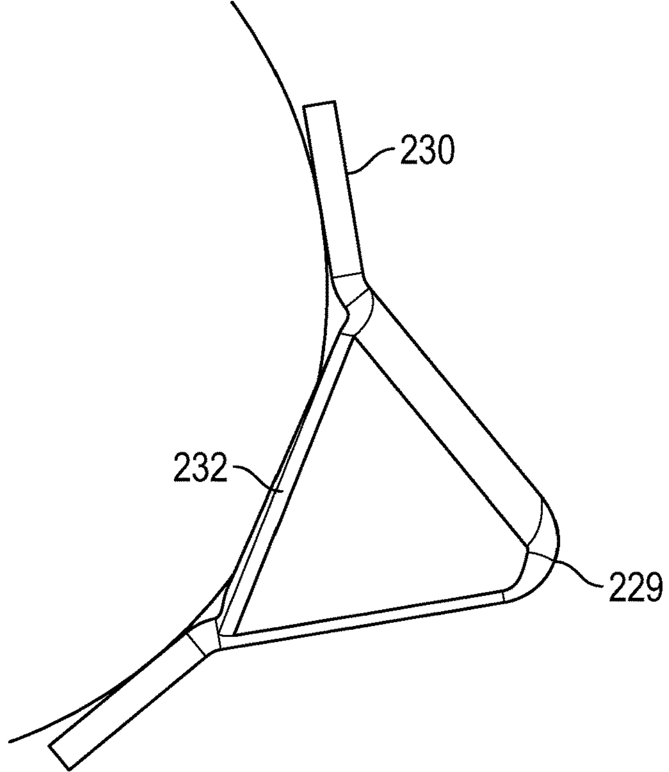
FIG. 9C is a side cutaway view of the wind deflector of FIG. 9 affixed to a vehicle rack.

An alternate embodiment of the present disclosure is depicted in FIGS. 9-9C. A wind deflector 200 includes indentations 226 formed along the leading edge 229 of the front or wind facing section. Wind deflector 200 is constructed form a flexible material capable of conforming to the profile of front bar 14A. As shown in FIG. 9B, the deflector 200 includes legs 230 and a central, flexible support member 232. The deflector 200 is attached to the front of the cross bar 14A of rack 10 by use of an adhesive that is either applied to bar 14A during installation or pre-applied to the rear of legs 230 and/or central support 232. As the wind deflector 200 is placed in contact with bar 14A, it is compressed into the bar 14A such that legs 230 spread apart and support 232 with the adhesive applied to the underside contacts bar 14A. The adhesive maintains the legs 230 and support 232 onto the surface of bar 14A.

Figure 10:
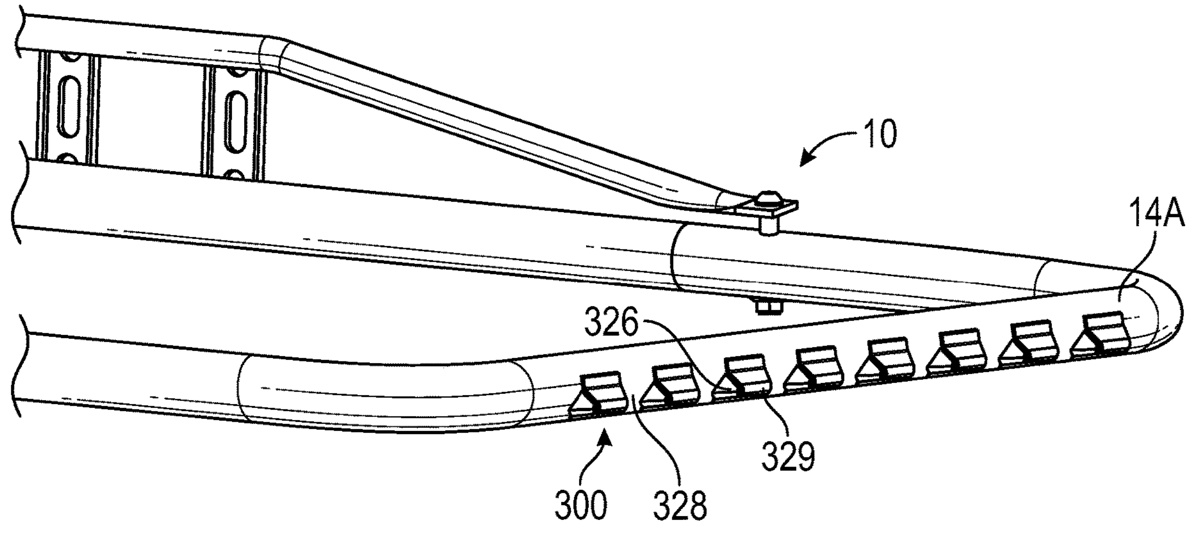
FIG. 10 is yet another embodiment of the wind deflector of the present disclosure.
Figure 10A:
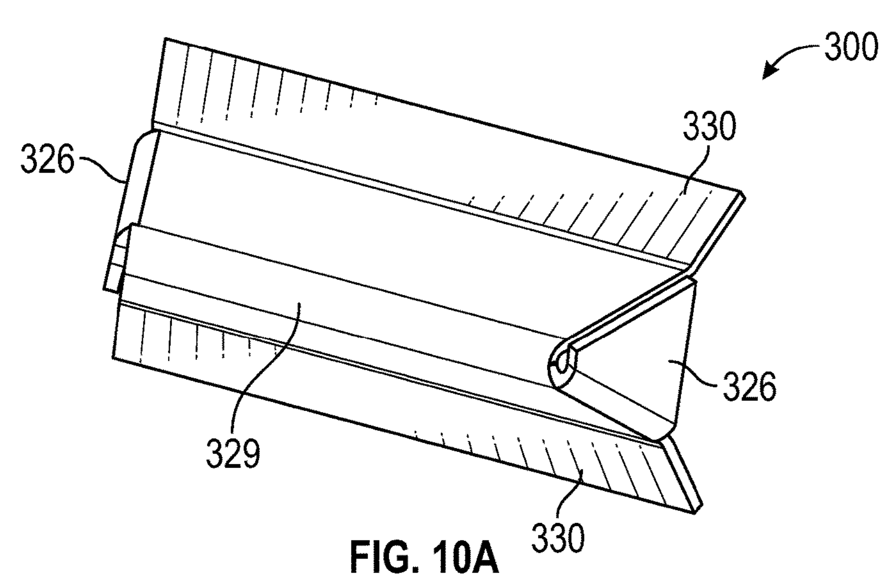
FIG. 10A is s front perspective view of a component of the wind deflector of FIG. 10.

Yet another alternative embodiment of the present disclosure is shown in FIGS. 10 and 10A. A plurality of compact wind deflectors 300 are shown mounted to the front bar 14A of a vehicle rack 10. Each wind deflector 300 includes legs 330 and has a leading edge 329. The side edges of the wind deflector 326 slope outwardly and away from the leading edge 329 toward the surface of the front 14A of rack 10. Each wind deflector 300 is affixed to the front 14A by an adhesive applied to legs 330. The plurality of wind deflectors 300 are attached to front bar 14A adjacent one another and separated by gaps 328. In this way, gaps 328 serve as vortex modifiers like the indentations described with reference to the previous embodiments described herein.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention.

What is claimed is:

1. A noise reducing wind deflector for use with a vehicle rack mounted on a vehicle said vehicle rack having at least two elongated support bars connected by a front and rear cross bar, the wind deflector comprising: a front section that faces the direction of travel of said vehicle, said front section being sloped to lessen wind drag wherein the front section includes a flow modifier located on a leading edge of the front section and at least one aperture; a top section located at the top of the front section, said top section contoured to correspond to the shape of the top of the front cross bar of the vehicle rack; a rear section having at least one slot extending downwardly from said top section wherein said top section and rear section encompass the top and the rear of the front cross bar of the vehicle rack when said deflector plate is attached thereto; and a bottom section extending rearwardly from the leading edge of the front surface oriented to allow air to flow thereunder; at least one retaining strap that attaches to the front section and extends under the front vertical bar of the vehicle rack and is attached to the rear section to retain the wind deflector on said front bar which at least one retaining strap comprises an elongated curved member having a flanged distal end with a threaded aperture for receiving therethrough an elongated attachment member comprising a threaded bolt and a notched section at its proximal end; wherein the aperture of the front section of the wind deflector is constructed so that in the case in which the flanged distal end of the retaining strap is placed against the back of the front section so that the aperture of the front section and the aperture of the flanged distal end are aligned, the elongated attachment member can be placed therethrough thereby securing the retaining strap to the back of the front section; and wherein the at least one slot of the rear section is constructed to receive and retain the notched section of the retaining strap; and wherein as said vehicle progresses, a forward air flow over the front section of the wind deflector is altered by the flow modifier such that vortex shedding is reduced and noise resulting from the air flow is mitigated.

2. The wind deflector according to claim 1, wherein the flow modifier comprises a plurality of indentations formed along the leading edge of the front surface.

3. The wind deflector of claim 2, wherein the indentations are v-shaped.

4. The wind deflector of claim 2, wherein the indentations are u-shaped.

5. The wind deflector of claim 2 wherein the indentations comprise a first section that slopes downward from the leading edge to a flat bottom section and a second section that slopes upwardly from the flat bottom surface to the leading edge.

6. The wind deflector of claim 5 wherein a front opening of the indentation is the distance between the top of the first section and the top of the second section and is at least 1.9 inches.

7. The wind deflector of claim 6 wherein the flat bottom section is located at least 0.37 inches below the leading edge.

8. The wind deflector of claim 1 wherein the slope of the front section is changed by altering the angle of the front section relative to the bottom section.

9. The wind deflector of claim 8 wherein the slope of the front section can be modified to optimize air flow over the wind deflector depending upon a design of the vehicle rack.

10. A frame for transporting cargo mounted externally of a vehicle having improved aerodynamic performance, said frame comprising: at least two elongated support bars running parallel to the length of the vehicle; a front vertical cross bar and a rear vertical cross bar each extending between said at least two elongate support bars, wherein the said front vertical cross bar additionally comprises: a front section having at least one aperture that faces the direction of travel of said vehicle, said front section having a top that has a shape and said front section being sloped upwardly from a leading edge to the top of said vertical front cross bar and that is contoured to correspond to the shape of the top of said vertical cross bar; a rear section having at least one slot that is contoured to correspond to the shape of the top of the vertical cross bar; and a flat bottom section; at least one retaining strap that attaches to the front section and extends under the front vertical bar of the vehicle rack and is attached to the rear section to retain the wind deflector on said front bar which at least one retaining strap comprises an elongated curved member having a flanged distal end with a threaded aperture for receiving therethrough an elongated attachment member comprising a threaded bolt and a notched section at its proximal end; wherein the aperture of the front section of the wind deflector is constructed so that in the case in which the flanged distal end of the retaining strap is placed against the back of the front section so that the aperture of the front section and the aperture of the flanged distal end are aligned, the elongated attachment member can be placed therethrough thereby securing the retaining strap to the back of the front section; and wherein the at least one slot of the rear section is constructed to receive and retain the notched section of the retaining strap; and wherein the said leading edge includes a plurality of air modifying indentations shaped to change a flow of air over said vertical front cross bar and to mitigate a noise caused by the flow of air over and under said front vertical cross bar.

11. The frame of claim 10 wherein the indentations are triangular in shape.

12. The frame of claim 10 wherein the frame includes a first and a second upper elongated support mounted to the top of the elongated support bars.

13. A noise reducing wind deflector for use with a vehicle rack mounted on a vehicle said vehicle rack having at least two elongated support bars connected by a front and rear cross bar, the wind deflector comprising: a front section having at least one aperture that faces the direction of travel of said vehicle, said front section having a top that has a shape and said front section being sloped upwardly from a leading edge to the top of said front cross bar and that is contoured to correspond to the shape of the top of said front cross bar; a rounded rear section having at least one slot that is contoured to correspond to the shape of the top of said front cross bar; a plurality of indentations extending away from the leading edge into the front section, opposite the direction of travel of the vehicle; a first and a second leg each extending from the bottom and top of the front section; a central support member extending between the top and bottom of the front section; at least one retaining strap that attaches to the front section and extends under the front cross bar of the vehicle rack and is attached to the rear section to retain the wind deflector on said front cross bar which at least one retaining strap comprises an elongated curved member having a flanged distal end with a threaded aperture for receiving therethrough an elongated attachment member comprising a threaded bolt and a notched section at its proximal end; wherein the aperture of the front section of the wind deflector is constructed so that in the case in which the flanged distal end of the retaining strap is placed against the back of the front section so that the aperture of the front section and the aperture of the flanged distal end are aligned, the elongated attachment member can be placed therethrough thereby securing the retaining strap to the back of the front section; and wherein the at least one slot of the rear section is constructed to receive and retain the notched section of the retaining strap; and wherein said wind deflector is mounted to the front cross bar of the vehicle rack such that as said vehicle progresses, a forward air flow over the front section of the wind deflector is altered by the indentations such that the air flow is modified and noise mitigated.

14. The wind deflector of claim 13 wherein the wind defector is constructed from a flexible material.

15. The wind deflector of claim 14 wherein said wind deflector is attached to the front cross by an adhesive.

16. The wind deflector of claim 15 wherein the adhesive is applied to an underside of the legs and the central support.

17. The wind deflector of claim 16 wherein said wind deflector is mounted to the front cross bar by placing the legs against the front cross bar and compressing the wind deflector into the front cross bar of the rack which brings the central support member in contact with the cross bar wherein the wind deflector is held thereon by the adhesive.

* * * * *